Aug. 1, 1967  C. W. MOSSBERG  3,333,489
LIQUID COOLED SPADE DRILLS
Filed May 6, 1965  2 Sheets-Sheet 1
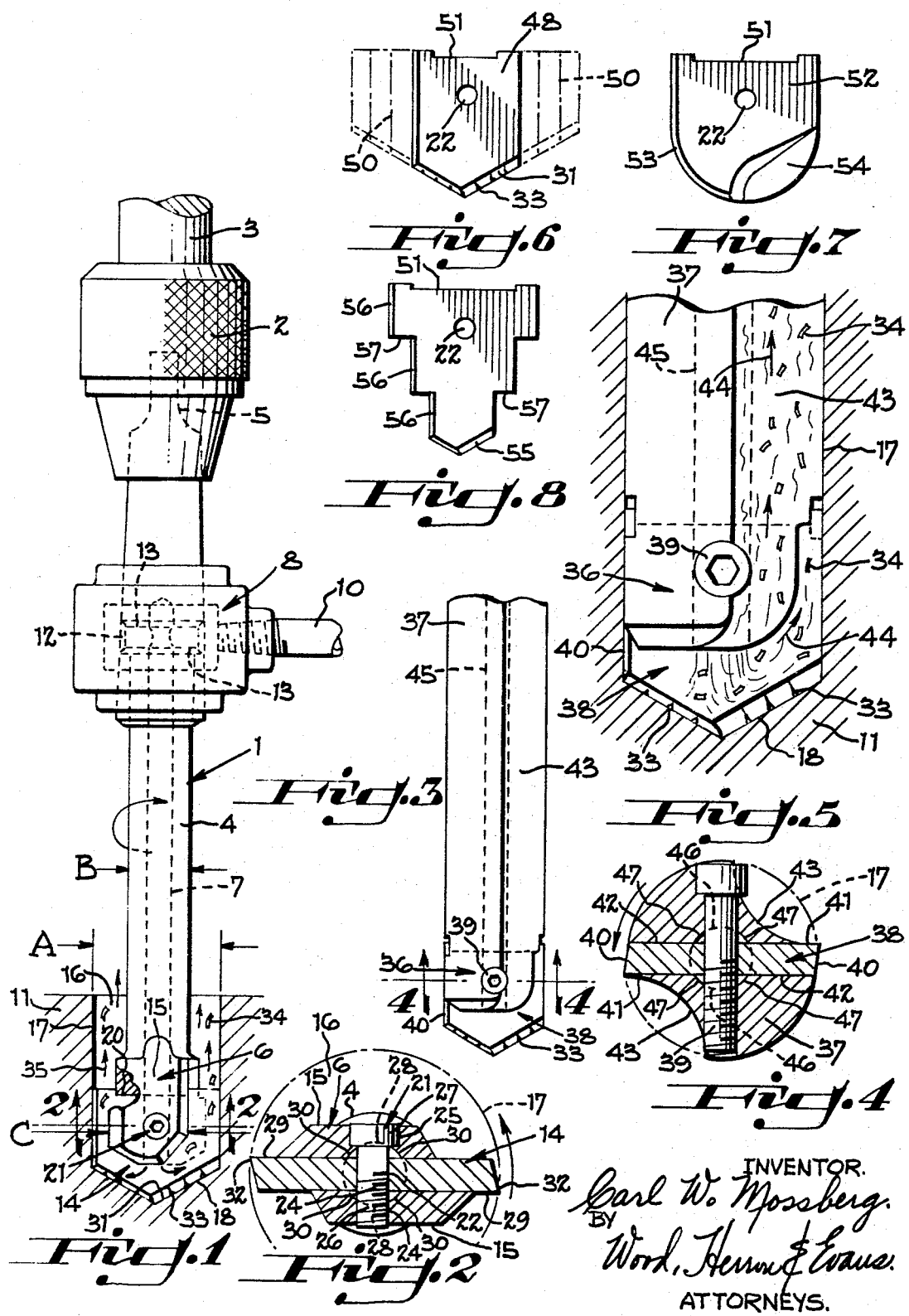
INVENTOR.
Carl W. Mossberg.
BY
Wood, Herron & Evans.
ATTORNEYS.

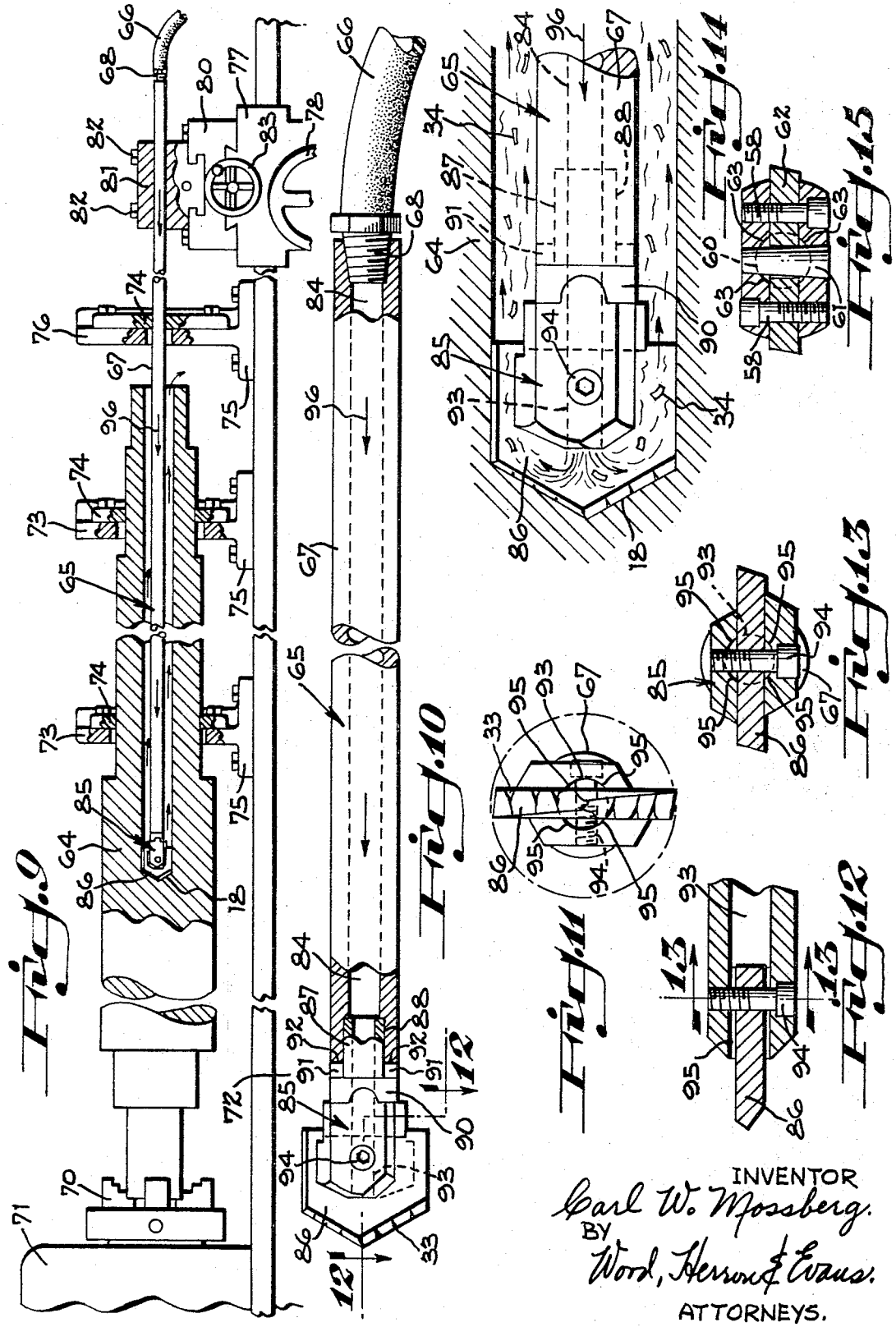

United States Patent Office 3,333,489
Patented Aug. 1, 1967

3,333,489
LIQUID COOLED SPADE DRILLS
Carl W. Mossberg, Cumberland, Wis., assignor to Waukesha Cutting Tools, Inc., Waukesha, Wis., a corporation of Wisconsin
Filed May 6, 1965, Ser. No. 453,590
6 Claims. (Cl. 77—68)

This invention relates to drilling or boring tools of the spade type, that is, tools which include a flat cutting bit mounted in the cutting end of the tool and bisecting the axis of rotation of the tool. The spade type drill or boring tool is distinguished from the well known twist drill in that its shank does not include the spiral flutes leading outwardly from the cutting end of the tool which, in the twist drill, are arranged to convey the cuttings from the inner end of the hole to its outer end for discharge.

The spade drill, with which the present invention is primarily concerned, includes an elongated cylindrical drill shank or stem which, in most cases, is smaller in diameter than the width of the cutting bit, thereby providing an annular space within the bore hole, surrounding the tool shank, and providing for the discharge of the cuttings to the outer end of the bore hole. However, in some instances, the width of the cutting bit, which includes forward cutting edges and also side cutting edges may be equal to the diameter of the drill stem or shank; in this case, the shank may be provided with longitudinal flutes extending outwardly from the side cutting edges to permit the discharge of the cuttings.

One of the primary objectives of the present invention has been to provide a spade drill having interchangeable cutting bits formed of hardened material, and wherein the stem or shank of the drill includes an axial bore adapted to project streams of liquid coolant to the cutting zone at the inner end of the bore hole to control the temperature of the cutting bit, thereby to improve the efficiency and life of the interchangeable bits.

The cooling action makes possible the drilling of hard materials or materials which are extremely difficult to drill or bore. According to this aspect of the invention, the drill proper, that is the shank or stem, may be fabricated from a length of drill rod having an axial bore, or from a length of tubing having an axial bore. In either case, the bore passes from the outer end of the stem to the cutting end. By virtue of this constructon, a source of liquid coolant may be connected to the outer end portion of the shank or stem of the drill to be projected outwardly into the drilling zone at the inner end portion of the bore hole.

A drilling tool employing this general principle is disclosed in Patent No. 2,817,983 issued to Carl W. Mossberg, the present inventor. In the prior Mossberg patent, the drill bit is permanently attached to the cutting end portion of the drill, whereas the detachable drill bits of the present invention permit the same drill shank to be utilized in drilling various hole diameters or configurations, utilizing the same basic tool shank with the interchangeable bits.

A further objective of the invention has been to provide a drilling or boring tool in which the interchangeable cutting bit bisects the coolant bore and in which, a clamping screw passes diametrically across the coolant bore at the cutting end portion of the bit to subdivide the bore and to provide four restricted nozzles which are adapted to project high velocity jet streams to the cutting zone of the bore hole and along the end and side cutting edges of the bit.

According to this aspect, the jet streams of liquid coolant are adapted to carry off the cuttings developed by the end and side cutting edges and to carry the cuttings, with the coolant, outwardly to the open end of the bore hole to improve the cutting action.

A further objective of the invention has been to provide a drill or boring tool embodying the coolant principles and interchangeable bits of the present invention, in which the tool may be constructed for use in drill presses and similar machines for relatively shallow drilling operations and in which the tool of the invention may also be mounted in a lathe or other boring machine to provide deep boring operations.

In one form of the drilling tool, which is intended for use with a drill press or similar machine, the shank of the tool is mounted in the rotating spindle of the drill press and is advanced longitudinally with respect to the workpiece which is clamped in stationary position with respect to the rotating tool. This tool is intended for relatively shallow drilling operations; hence, the shank of the drill does not require any intermediate supports in order to hold the cutting end of the tool in alignment with the axis of the work. In order to project the liquid coolant to the cutting end of the rotating tool, there is provided a stationary swivel joint, embracing the rotating shank of the drill and arranged to supply the liquid coolant under pressure to the axial bore of the shank, which in turn, projects the coolant, in the form of jet streams from the cutting end of the tool to the cutting edges of the bit in the cutting zone.

In the tool designed for deep boring operations, the shank of the tool preferably is in the form of a length of tubing having an axial bore and being of uniform diameter adapted to be mounted in the longitudinally shiftable carriage or other longitudinal shiftable member of the boring tool so as to feed the non-rotating tool axially. The elongated workpiece has one end clamped in the rotating chuck of the lathe headstock or similar element, and is supported in axial alignment with the boring tool by means of one or more steady rests which support the workpiece rigidly for rotary motion. The elongated boring tool is also supported by one or more steady rests and is fed longitudinally along the axis of the workpiece. A source of liquid coolant is connected to the outer end of the non-rotating drill shank to provide a flow of coolant while the non-rotating tool is fed axially with reference to the rotating workpiece.

The various features and advantages of the invention will be more fully apparent to those skilled in the art from the following description, taken in conjunction with the drawings.

In the drawings:

FIGURE 1 is a fragmentary side elevation illustrating one form of the spade drill of this invention, mounted in the rotating spindle of a machine tool, such as a drill press, with a stationary swivel joint mounted upon the stem or shank of the drill to supply liquid coolant to its cutting end.

FIGURE 2 is an enlarged sectional view of the drill as viewed along the line 2—2 of FIGURE 1.

FIGURE 3 is a fragmentary view of the end portion of a modified form of the drill in which the width of the cutting bit is equal to the diameter of the tool shank.

FIGURE 4 is an enlarged sectional view taken along the line 4—4 of FIGURE 3, detailing the arrangement by which the cutting bit is clamped in place in the end portion of the drill shank.

FIGURE 5 is an enlarged fragmentary end view of the working end portion of the drill shown in FIGURE 3, illustrating the flow of coolant and cuttings upwardly along the shank of the tool.

FIGURE 6 is a side elevation of one of the demountable cutting bits for which the tool is designed, illustrating, in broken lines, a series of bit sizes which may be mounted in a given tool shank.

FIGURES 7 and 8 are views similar to FIGURE 6, showing typical forms of demountable bits shaped to form a required configuration in the end of a blind hole.

FIGURE 9 is a general side elevation showing a slightly modified version of the spade drill, in which the drill is utilized in a horizontal position in a lathe or similar machine tool for deep boring operations.

FIGURE 10 is an enlarged fragmentary side view of the tool shown in FIGURE 9, further illustrating the structural details.

FIGURE 11 is an enlarged end view of the drill shown in FIGURE 10, particularly illustrating the mounting of the cutting bit therein.

FIGURE 12 is an enlarged fragmentary view of the end portion of the boring tool, as indicated along line 12—12 of FIGURE 10, detailing the clamping arrangement of the interchangeable bit.

FIGURE 13 is an enlarged sectional view taken along the line 13—13 of FIGURE 12, further detailing the end portion of the boring tool.

FIGURE 14 is an enlarged fragmentary end view, generally similar to FIGURE 5, illustrating the flow streams of liquid coolant and cuttings from the forward end of the bore hole and along the shank of the boring tool.

FIGURE 15 is an end view similar to FIGURE 13, illustrating a modified mounting arrangement for the interchangeable cutting bit.

*Tool construction for drill press operations*

One form of the spade drill 1 of the present invention may be mounted in the chuck 2 of a standard drill press, as shown in FIGURE 1. In order to provide a driving connection with the spindle 3 of the press, the upper end of the tool shank 4 includes a conventional tang 5 which interfits a cross slot (not shown) formed in the drill spindle 3. The chuck 2, which is conventional, clamps the upper portion of the shank 4 to the spindle 3, with the tang 5 engaged in the cross slot of the spindle.

In order to supply liquid coolant to the cutting end, which is indicated generally at 6, the drill shank 4 includes an axial bore 7 extending from its upper end to its cutting end 6. The liquid coolant is supplied under pressure to the axial bore 7 by means of a stationary swivel joint 8 which rotatably embraces the tool shank 4. The swivel joint represents a commercially available unit and for this reason, has not been disclosed in detail.

The liquid coolant is supplied to the swivel joint 8 by way of a flexible conduit 10, which in turn, communicates with a coolant pump (not shown). The coolant pump forms a part of a circulatory system which collects the coolant as it is discharged from the upper end of the workpiece 11 (FIGURE 1) and which filters the coolant, then returns it to the pump for recirculation, under pressure, to the drilling tool.

As shown in FIGURE 1, the upper end portion of the drill shank 4 includes an annular groove 12 enclosed within the stationary swivel joint 8, which is in sealing engagement with reference to the rotating shank of the drill. One or more radial bores 13 extend from the annular recess 12 through the shank 4 to the axial bore 7, so as to conduct the liquid coolant under pressure to the cutting end 6 of the tool.

In practise, the drill 1, which is designed for use in a conventional drill press, usually is not intended for deep drilling operations since the conventional drill press or other drilling machine is not provided with means for holding an elongated rotating drill shank in accurate alignment with reference to the axis of the stationary workpiece 11. It will be understood that the cutting end 6 of the relatively short drill 1 is adapted to project coolant streams into the end of the hole being drilled to provide maximum cutting efficiency by virtue of its chip flushing and cooling action, as explained in detail below. The typical drill shown in FIGURE 1 utilizes interchangeable cutting bits 14, which are formed of hard, long-wearing material, the cutting edges of which are configured to provide the desired cutting and chip breaking action or to delineate a required hole profile.

In the spade drill 1, illustrated in FIGURES 1 and 2, the cutting end portion 6 is larger than the shank or stem 4 of the drill. The cutting end portion 6 includes flats 15—15 on opposite sides which lead to the smaller diameter shank 4 to provide an annular passageway 16 in the bore hole 17 for the discharge of the liquid coolant and the chips upwardly from the cutting zone 18 in the lower end of the hole.

The enlarged cutting end portion 6 of the drill is slotted transversely as at 20 (FIGURES 1 and 2), the slot intersecting the lower end of the axial bore 7. It will be noted in FIGURE 2, that the axial bore 7, which leads to the cutting end 6 of the drill, has a diameter which is greater than the width of the cross slot 20. The hardened cutting bit 14 snugly interfits the slot 20 and is held in place by a clamping screw 21. In order to admit the clamping screw 21, each interchangeable hardened bit 14 includes a hole 22 (FIGURES 6, 7 and 8) mating with a hole 23 (FIGURE 2) bored through the cutting end 6 of the tool. One end portion of the hole 23, is tapped, as indicated at 24 (FIGURE 2), while the opposite portion of the hole is of larger diameter and is counter-bored as at 25. The shank 26 of the clamping screw 21 is threaded into the tapped portion 24 of the hole and the head 27 of the screw interfits the counter-bore 25. When the screw 21 is tightened, it draws the opposed split side sections of the cutting end portion 6 into clamping engagement against opposite sides of the hardened cutting bit 14.

It will be noted (FIGURE 2) that the cutting bit 14 bisects the axial bore 7 and thus divides the axial bore into two coolant outlet nozzles 28—28, which are presented at the end of the tool and disposed on opposite sides of the bit 14.

The shank 26 of the clamping screw 21 is also smaller in diameter than the axial bore 7, and bisects the axial bore. The shank 26 of the screw thus subdivides each coolant nozzle 28, thereby providing four, relatively small, jet-type nozzles 30 adapted to project high velocity coolant streams from the end of the tool into the cutting zone 18 at the end of the bore hole 17 (FIGURE 2). The clamping screw 21 thus serves the double function of clamping the bit 14 in place and also of forming the restricted jet nozzles 30.

As best shown in FIGURE 1, the cutting bit 14 has end cutting edges 31 which are tapered to a point. The cutting edges 31 are located on opposite sides of the bit on the leading edges, in the direction of rotation of the tool, as indicated by the arrow in FIGURES 1 and 2. The opposite side edges of the bit include side cutting edges 32, forming continuations of the end cutting edges 31 and located on the leading sides or working faces 29 of the bit, in the direction of rotation. The side cutting edges 32 act upon the periphery of the bore hole 17 in the cutting zone 18 while the end or forward cutting edges 31 act upon the blind end of the hole during the cutting operation.

In the form disclosed in FIGURES 1 and 2, the end cutting edges 31 of the bit include a series of notches 33. These notches provide a chip breaking action, reducing the metallic chips 34 (FIGURE 5) to a relatively small size, adapting them to be flushed readily from the cutting zone 18 outwardly along the bore hole 17 (annular passageway 16), as indicated diagrammatically.

In the form illustrated in FIGURE 1, the width of the cutting bit, as indicated at A, is substantially greater than the diameter of the drill shank, as indicated at B. By virtue of this arrangement there is provided the annular space 16 within the bore hole surrounding the shank 4 of the drill for the upward flow of the mixture of chips 34 and liquid coolant, as indicated by the arrows 35. As noted earlier, the drill body includes flats 15 parallel with the opposite side of the bit 14; the flats facilitate the flow of coolant upwardly from the cutting zone 18. This flow normally would be somewhat restricted because the diameter C of the cutting end portion is greater than the diameter B of the drill shank 4.

Modified spade drill

In the modified version of the spade drill shown in FIGURES 3, 4 and 5, the cutting end portion 36 of the drill shank 37 is substantially equal in diameter to the width of the cutting bit 38. In this arrangement, the opposite sides of the bit 38 are chamfered as at 40 to delineate the side cutting edges which are disposed at the working faces 41 of the bit, on opposite sides. It will be noted that the chamfered sides 40 blend into the periphery of the drill shank 37, such that the opposed portions 42 (FIGURE 4) of the drill body reinforce the side cutting edges of the bit. The bit 38 is held in place by a clamping screw 39 (FIGURES 4 and 5), similar to the clamping screw 21 of FIGURE 2.

In order to provide for the discharge of the chips and coolant, the drill shank 37 includes flutes 43—43 on opposite sides extending longitudinally of the drill shank. The flutes expose the working faces 41 of the bit and provide passageways for the discharge of the coolant and chips from the cutting zone 18, as indicated by the arrows 44 in FIGURE 5.

As best shown in FIGURES 3, 4 and 5, the modified spade drill is provided with an axial bore 45 extending through the drill shank 37 from its upper end to its cutting end portion 36. The upper end of the shank includes a tang (not shown) as disclosed with reference to FIGURE 1, which interfits a chuck 2. The shank 37 of the drill includes a swivel joint 8, as shown in FIGURE 1 for supplying liquid coolant to the axial bore 45 of the drill.

It will be noted that the cutting bit 38 bisects the axial bore 45 and thus divides the bore into two nozzles 46 for projecting the liquid coolant from the cutting end 36. The shank of the clamping screw 39 (which passes across the bore and through the cutting bit) sub-divides the two coolant nozzles 46 to form four restricted relatively small jet nozzles 47 adapted to project high velocity coolant streams from the end of the tool into the cutting zone 18 at the blind end of the bore hole 17 (FIGURE 5).

As indicated by the arrows 44 (FIGURE 5), the stream of coolant, with the cuttings or chips 34 entrained therein, flow directly across the working faces 41—41 of the bit on opposite sides and into the flutes 43 on opposite sides of the drill shank. The high velocity coolant streams projected from the jet nozzles 47 thus carry the chips 34 rapidly from the cutting zone at the working faces 41 directly into the flutes 43 to the outer end of the bore hole 17 for discharge from the workpiece.

Cutting bits

As noted above, the drill is furnished for use with several different interchangeable cutting bits which may be mounted in the cutting end portion simply by removing the clamping screw. Thus, as shown in FIGURE 6, the bit 48 may be furnished in a series of different widths, as indicated by the broken lines 50, thus making it possible to drill a series of different hole diameters with a given tool shank, simply by selecting a bit of the required width. It will be noted that the upper edge of each bit includes a shallow recess 51 which interfits the periphery of the drill shank. The recess 51 aids in centering the bit with reference to the drill shank.

The cutting bit 52 shown in FIGURE 7 is intended for boring holes which are to be provided with a partially cylindrical inner end. For this purpose, the cutting edge 53 has a semi-circular configuration. In order to provide a smooth finish at the blind end of the hole, the chip breaking notches have been omitted; instead, the working faces on opposite sides of the bit are provided with negative rake areas 54 which provide a chip breaking action.

In the form shown in FIGURE 8, the bit is designed for drilling a blind hole, the inner end of which is of step-cut formation. For this purpose, the forward end of the drill may include a tapered cutting edge 55 and side cutting edges 56 with two steps 57—57 forming respective pairs of end cutting edges.

The modified arrangement shown in FIGURE 15 is similar to that shown in FIGURE 1. However, in this case the cutting bit is clamped in place by two opposed clamping screws 58—58, which are located at opposite sides of the axial bore 60. In this construction, a tapered dowel pin 61 passes through the cutting end portion of the drill and through the center of the cutting bit 62 to locate the bit accurately in position. It will be noted that the dowel pin 61 bisects the axial bore 60 and thus delineates the four restricted jet nozzles 63 at the cutting end of the tool.

It will be understood that during the drilling or boring operation, the drill is fed axially into the work at a rate which is consistent with the type of material of the workpiece, while the liquid coolant is forced through the axial bore under sufficient pressure to project the jet streams outwardly from the four restricted passageways and against the cutting edges and blind end of the hole. As the metal or material is removed by the end and side cutting edges, the jet streams of coolant rapidly flush away the chips or cuttings as they are formed so as to keep the bore as clear as possible. This action improves cutting efficiency and also keeps the temperature of the cutting bit and workpiece under control in the cutting zone.

It will be understood that the same cutting action takes place in the several forms of the invention, either along the annular space surrounding drill shanks or upwardly through the flutes. As noted above, the discharging coolant is collected and recirculated back to the spindle for reuse with the cuttings filtered or otherwise separated from the coolant.

Tool construction for deep boring operations

A spade drill or boring tool embodying the principles of the present invention may also be mounted in a lathe or boring machine, as shown in FIGURE 9. This mode of operation is utilized in deep boring operations in which the workpiece 64 and the drill require the use of rigid supports or steady rests in order to achieve accurate alignment. It will be understood that, when applied to a lathe, as illustrated (FIGURE 9), the drill or boring tool 65 is clamped in a non-rotating position with reference to the rotating workpiece 64; therefore, the swivel joint 8 shown in FIGURE 1 is omitted. Instead, a coolant supply conduit 66 is connected directly to the outer end of the stationary drill shank 67 as at 68.

In the typical example, illustrating the boring tool 65 mounted in a lathe (FIGURE 9), the elongated rotating workpiece 64 has one end clamped in the conventional chuck 70 of the lathe headstock 71. The headstock 71 is mounted in the usual manner upon the bed 72 of the lathe, which includes longitudinal slideways.

In order to prevent lateral deflection of the elongated workpiece 64, as an incident to its rotary motion, there is provided a series of steady rests 73, in the present disclosure, two in number. The steady rests 73 are of conventional design and embrace the external periphery of the workpiece 64. Each steady rest 73 includes adjustable shoes 74 which are clamped by means of bolts in contact with the periphery of the workpiece. Each steady rest 73 further includes a foot 75, which is secured in place upon the bed of the lathe by means of clamping bolts.

The elongated drill 65 is centered with respect to the axis of the rotating workpiece by means of one or more tool steady rests 76. The tool steady rest 76 (one being disclosed) is similar to the steady rests 73 of the workpiece and is adjusted to embrace the shank 67 of the stationary drill 65. It will be understood, at this point, that the stationary drill or boring tool 65 is fed longitudinally with reference to the axis of the rotating workpiece 64; therefore, the tool steady rest 76 provides a snug but axially slidable fit with reference to the shank 67 of the drill.

During the drilling operation, the stationary tool 65 is fed longitudinally with reference to the axis of the workpiece 64 by means of a carriage, indicated generally at 77, which is slidably mounted upon the ways of the lathe bed 72. The carriage 77 is conventional and may be fed either manually by operation of a hand wheel 78 or it may be coupled to the lead screw or to the feed rod (not shown) of the lathe for automatic feed in the usual way.

The outer end portion of the tool stem or shank 67 is clamped in a cross slide 80 which is mounted for transverse adjustment upon the upper portion of the carriage 77. For this purpose, the cross slide 80 includes a clamping block 81 embracing the end portion of the drill shank 67, the clamping block being held in engagement with the shank by means of clamping bolts 82 threaded into the cross slide. Transverse adjustment of the cross slide is carried out by operation of a hand wheel 83 which is mounted upon a screw shaft (not shown) journalled in the carriage in the usual manner.

The liquid coolant is projected under pressure through the axial bore 84 (FIGURE 10) of the tool to the cutting zone 18, thereby to flush out the chips and also to keep down the temperature of the cutting bit and workpiece. By virtue of the cooling action and flushing of the chips, the machine tool may be adjusted to provide a relatively heavy feed (axial motion of the drill as imparted by the carriage). The drill is particularly efficient in the deep boring of workpieces formed of extremely hard materials or materials which exhibit considerable resistance to boring operations.

Described in detail with reference to FIGURES 10 to 14 the stem 67 of the drill 65 may be formed of steel tubing providing the axial bore 84. The outer end of the stem is drilled and tapped to receive the coupling element 68 of the flexible coolant conduit 66. As noted above, the tool is fed longitudinally with respect to the rotating workpiece; therefore, the conduit 66 is formed of flexible material.

The cutting end portion 85 of the elongated drill 65 is similar to the spade drill shown in FIGURE 1, including the interchangeable cutting bits 86. However, the structure of the elongated drill 65 differs somewhat in detail from that disclosed earlier.

In the preferred embodiment of the elongated boring tool or drill 65 (FIGURES 9-14) the cutting end 85 of the tool is fabricated as a separate insert which is mounted in the end portion of the tubular drill stem 67. Thus, as shown in FIGURE 10, the cutting end portion 85 includes a cylindrical shank 87, while the receiving end of the tubular drill stem includes a counter-bore 88, adapted to receive the cylindrical shank. The cutting end portion 85 includes a cylindrical counter-turned portion 90 which is equal in diameter to the periphery of the tubular stem 67. The counter-turned portion 90 provides a shoulder engageable against the end of the tubular stem 67.

In addition, the cutting end 85 includes a pair of keys 91—91 projecting from the counter-turned portion 90 on diametrically opposite sides of the cutting end portion 85 (FIGURE 10). The end of the tubular stem includes a pair of slots 92—92 on diametrically opposite sides adapted to receive the keys 91, to provide a driving connection with the tubular stem 67. In the preferred construction, the shank portion 87 is inserted into the counter-bore 88, with the keys 91 interfitting the keyways 92. The cutting end portion preferably is secured in place by silver soldering or brazing the shank 87 within the counter-bore 88 so as to provide a permanent structure.

As best shown in FIGURE 10, the cutting end portion 85 includes an axial bore 93 communicating with the axial bore 84 of the tubular stem 67. The axial bore 93 of the cutting end insert 85 is bisected by the cutting bit 86. The axial bore 93 is divided by the bit 86 and is subdivided by the clamping screw 94 so as to provide the four high velocity jet nozzles 95 (FIGURES 11 and 13).

In the preferred form of the invention, the deep drilling tool 65 of FIGURES 9 and 10 is furnished to the user in assembled condition, that is, with the cutting insert 85 permanently brazed to the tubular stem 67. An assortment of cutting bits, for a given range of hole diameters (as explained earlier with reference to FIGURES 6-8) may be furnished with each given tool assembly 65.

It will be understood that in the elongated spade drill disclosed in FIGURES 9-14, the cutting bit 86 includes end cutting edges which may be notched to provide the chip breaking action described above. The cutting bit also includes side cutting edges which determine the diameter of the hole.

As shown by the arrows 96, the coolant is advanced under pressure through the axial bore 84 of the drill stem and through the bore 93 of the cutting insert 85. The coolant stream is then divided by the bit and subdivided by the shank of the clamping screw to form the four high velocity jet nozzles 95, as described earlier. It will be understood that the various modifications of the tool, as shown in FIGURES 1, 3 and 6–8 may be incorporated in the deep boring tool 65 of FIGURE 9.

Having described my invention I claim:

1. A drilling tool adapted to form a bore hole in a workpiece while supplying liquid coolant to the cutting zone at the inner end of the bore hole comprising:
  a drill stem having a cutting end and having an axial coolant bore extending to said cutting end, said bore adapted to supply liquid coolant to the cutting end;
  a demountable cutting bit secured in the cutting end of the tool and passing across said axial bore;
  said cutting bit having a thickness less than the diameter of the axial bore and providing at least one coolant nozzle presented at the cutting end of said drilling tool;
  an attaching element securing the cutting bit in position in the cutting end of the drilling tool;
  said attaching element passing across the coolant nozzle which is delineated by said cutting bit;
  said attaching element restricting said coolant nozzle and delineating at least one high velocity jet nozzle at the cutting end of the drilling tool;
  said high velocity jet nozzle adapted to project a high velocity stream of liquid coolant from the axial bore of said stem into the cutting zone at the inner end of said bore hole, thereby to cool the bit and to flush the cuttings from said cutting zone of the workpiece for discharge from the open end of the bore hole.

2. A drilling tool adapted to form a bore hole in a workpiece while supplying liquid coolant to the cutting zone at the inner end of the bore hole comprising:
  a drill stem having a cutting end and having an axial coolant bore extending to said cutting end, said bore adapted to supply liquid coolant to the cutting end;
  a demountable cutting bit secured in the cutting end of the tool and bisecting said axial bore;
  said cutting bit having a thickness less than the diameter of the axial bore and delineating a pair of coolant nozzles presented at the cutting end of said drilling tool on opposite sides of said cutting bit;
  an attaching element securing the cutting bit in position at the cutting end of the drilling tool;
  said attaching element having a width less than the diameter of said axial bore and subdividing said coolant nozzles, thereby providing a plurality of restricted, high velocity jet nozzles at the cutting end of the drilling tool;

said high velocity jet nozzles adapted to project high velocity streams of liquid coolant from the axial bore of said stem into the cutting zone at the inner end of said bore hole and on opposite sides of said cutting bit, thereby to cool said bit and to flush the cuttings from said cutting zone of the workpiece for discharge from the open end of the bore hole.

3. A drilling tool adapted to form a bore hole in a workpiece while supplying liquid coolant to the cutting zone at the inner end of the bore hole comprising:

a drill stem having a cutting end and having an axial coolant bore extending to said cutting end, said bore adapted to supply liquid coolant to the cutting end;

the cutting end of said shank having a slot extending transversely thereof and bisecting said axial bore;

said slot having a width less than the diameter of said axial bore;

a demountable cutting bit mounted in said slot and bisecting said axial bore;

said cutting bit having a thickness less than the diameter of the axial bore and delineating a pair of coolant nozzles presented at the cutting end of said drilling tool on opposite sides of said cutting bit;

an attachment element passing through the cutting end of the drilling tool and through said cutting bit and securing the cutting bit in position at the cutting end of the drilling tool;

said attaching element having a diameter less than the diameter of said axial bore and bisecting the coolant nozzles which are delineated by said cutting bit;

said attachment element thereby subdividing said coolant nozzles and a plurality of restricted high velocity jet nozzles at the cutting end of the drilling tool;

said high velocity jet nozzles adapted to project high velocity streams of liquid coolant from the axial bore of said stem into the cutting zone at the inner end of said bore hole and on opposite sides of said cutting bit, thereby to cool said bit and to flush the cuttings from said cutting zone of the workpiece for discharge from the open end of the bore hole.

4. A drilling tool adapted to from a bore hole in a workpiece while supplying liquid coolant to the cutting zone at the inner end of the bore hole, said drilling tool comprising:

a drill stem having a cutting end and having an axial coolant bore extending at least partially through said stem to said cutting end, said coolant bore adapted to supply coolant to the cutting end;

the cutting end of said tool stem having a slot extending transversely thereof and bisecting said axial bore;

said slot having a width less than the diameter of said axial bore;

a demountable cutting bit disposed in said slot and bisecting said axial bore;

said bit delineating a pair of coolant nozzles presented at said cutting end;

and an attachment element passing through the cutting end of said drill stem and through said cutting bit and securing the bit in said slot;

said attachment element having a diameter less than the diameter of said axial bore and bisecting said coolant nozzles which are delineated by said bit;

said attachment element subdividing said pair of coolant nozzles and providing respective pairs of restricted jet nozzles located on opposite sides of the cutting bit;

said jet nozzles adapted to project high velocity coolant streams from said jet nozzles into the said cutting zone during the boring operation;

the drill stem having a diameter less than the width of the cutting bit and providing an annular discharge area within the bore hole surrounding the drill stem.

5. A drilling tool adapted to form a bore hole in a workpiece while supplying liquid coolant to the cutting zone at the inner end of the bore hole, said drilling tool comprising:

a drill stem having a cutting end and having an axial coolant bore extending at least partially through said stem to said cutting end, said coolant bore adapted to supply coolant to the cutting end;

the cutting end of said tool stem having a slot extending transversely thereof and bisecting said axial bore;

said slot having a width less than the diameter of said axial bore;

a demountable cutting bit disposed in said slot and disecting said axial bore;

said bit having a thickness less than the diameter of the said axial bore and delineating a pair of coolant nozzles presented at said cutting end;

and a clamping screw passing through the cutting end of said drill stem and through said cutting bit;

said clamping screw having a head at one end seated at one side of said cutting end;

said screw having a shank portion projecting across the said axial bore, through said cutting bit and having an end portion opposite said head threaded into the cutting end of the cutting end opposite said head, thereby drawing the slotted portion of the said cutting end into pressure engagement against opposite sides of said cutting bit;

the shank of said clamping screw having a diameter less than the diameter of said axial bore and bisecting said coolant nozzles which are delineated by said bit;

said shank of the clamping screw thereby subdividing said pair of coolant nozzles and providing respective pairs of restricted jet nozzles located on opposite sides of the cutting bit;

said jet nozzles adapted to project high velocity coolant streams from said jet nozzles into the said cutting zone during the boring operation, thereby cooling the bit and flushing the cuttings from the hole.

6. A drilling tool adapted to machine a bore hole in a workpiece while supplying liquid coolant to the cutting zone at the inner end of the bore hole comprising:

a drill stem having a cutting end and having an axial coolant bore extending to said cutting end, said axial bore adapted to supply coolant to the cutting end;

the cutting end of said drill stem comprising an insert element including a shank inserted into said cutting end of the drill stem and secured therein;

said insert element including an axial bore communicating with the axial bore of the drill stem;

the outer end of said insert element having a slot extending transversely thereof and bisecting the axial bore of the insert element;

said slot having a width less than the diameter of the axial bore of said insert element;

a cutting bit mounted in the slot of said insert element and bisecting the axial bore thereof;

said bit having a thickness less than the diameter of the axial bore of the said insert element and providing a pair of coolant nozzles presented at the end of said insert element;

and an attachment element projecting transversely through said cutting bit and through said axial bore of the insert element, said attachment element bisecting the pair of coolant nozzles and delineating a pair of restricted passageways presented at the outer end of said insert member;

said restricted passageways adapted to direct high velocity streams of liquid coolant from the end of said insert element and into the cutting zone, thereby cooling the cutting bit and flushing the cuttings from the cutting zone.

No references cited.

FRANCIS S. HUSAR, *Primary Examiner.*